Patented Jan. 18, 1949

2,459,144

UNITED STATES PATENT OFFICE 2,459,144

MANUFACTURE OF MALONIC ESTER

Charles F. Christie, Indianapolis, Ind., assignor to Eli Lilly and Company, Indianapolis, Ind., a corporation of Indiana No Drawing. Application May 19, 1947, Serial No. 749,092

3 Claims. (Cl. 260—485.)

This invention relates to an improved process of manufacturing diethylmalonate.

Diethylmalonate, or malonic ester as it is commonly called, is an intermediate used in the manufacture of barbituric acids. It is generally manufactured by a process of simultaneous hydrolysis and esterification of sodium cyanoacetate. This process has been described in detail by Ross and Bibbins (Ind. and Eng. Chem., vol. 29, pp. 1341–1343, Dec. 1937). Broadly the above process is carried out as follows: Monochloroacetic acid, sodium cyanide and sodium hydroxide are reacted in concentrated aqueous solution and the reaction mixture is largely freed from water yielding a moist mixture of sodium cyanoacetate and sodium chloride which is called salt cake. The salt cake is then gently refluxed with a mixture of ethanol and sulfuric acid. During the refluxing of the reaction mixture the carboxyl group of the sodium cyanoacetate is esterified, and the cyano group is simultaneously hydrolyzed and esterified. The malonic ester thus formed is isolated by diluting the reaction mixture with water and extracting the diluted mixture with several portions of benzene. The benzene extract is washed with aqueous alkali and water to remove acidic components and is fractionally distilled to recover the malonic ester. The yield from the above process is, as ordinarily expressed, about 70 percent of theory on the basis of malonic ester of 90 percent purity.

I have found that the yield of malonic ester normally obtained in production runs in accordance with the above process may be substantially increased by a modification of the process. I have discovered that by adding to the hydrolysis and esterification reaction mixture of sodium cyanoacetate (salt cake), sulfuric acid, and ethanol, a portion of the benzene which in the customary process is used to extract the malonic ester from the reaction mixture, there is obtained an appreciable increase in the yield of malonic ester.

My improved process therefore departs from the standard process which has been in commercial use for many years, by effecting the simultaneously hydrolysis and esterification of the sodium cyanoacetate in a reaction mixture comprising salt cake (sodium cyanoacetate), sulfuric acid, ethanol, and an amount of benzene.

The amount of benzene to be added to the reaction mixture may be varied over a wide range. Desirably it is added in an amount of about 0.5 to about 1.5 mols of benzene per mol of sodium cyanoacetate present in the reaction, and preferably in an amount of about 1.0 mol.

The proportionate amounts of alcohol and sulfuric acid used in the reaction mixture remain substantially unchanged from those customarily employed. The preferred proportions of the reactants are: 1 mol of sodium cyanoacetate, 2.8 mols of sulfuric acid, 2.8 mols of ethanol, and 0.9 mol of benzene.

In my modified process the reaction is carried out at the refluxing temperature of the reaction mixture, which is about 70° to about 80° C. instead of about 100° C. or higher as is the case when no benzene is used.

Dilution of the reaction product with water and extraction of the malonic ester with benzene are not changed from the procedures normally used. The benzene already added to the reaction mixture serves as a portion of the benzene required for the extraction of the malonic ester.

I have observed that in my modified process there are produced fewer by-products such as the mono-ester of malonic acid whose formation reduces the yield of the desired malonic ester. Furthermore, the formation of colored by-products is reduced. Additionally, my modified process apparently suppresses the formation of ferric ferrocyanide (Prussian blue) which is normally produced in the customary process when the reaction is carried out in iron stills. The avoidance of ferric ferrocyanide is highly desirable since this substance causes the formation of persistent emulsions during the extraction of the malonic ester with benzene, and is difficult to remove from the reaction mixture.

In my improved process I may obtain yields as high as 90 percent or over of malonic ester of about 90 percent purity. This represents an increase in yield of about 20 percent over that obtained by the customary process.

The following example is illustrative of the specific practice of my invention.

Sodium cyanoacetate (salt cake) is prepared according to the customary process by neutralizing 640 lbs. of monochloroacetic acid with 50 percent sodium hydroxide solution and reacting the sodium monochloroacetate with 364 lbs. of sodium cyanide.

The salt cake so prepared is dispersed in a solution of 65 gallons of benzene and 135 gallons of ethanol, and to the mixture 1870 lbs. of commercial sulfuric acid are added. The initial exothermic reaction is allowed to proceed to completion and the mixture is then refluxed at about 72 to about 78° C. for about 12 hours. At the end of the period of refluxing, the reaction mixture is cooled and diluted with about 65 gallons of water. 50 gallons of benzene are added, the mixture is stirred and then allowed to stand. The layer of benzene containing the malonic ester which separates is removed. The diluted reaction mixture is then re-extracted with two 60 gallon portions of benzene. The combined benzene extracts are first washed with water to remove most of the sulfuric acid, then with dilute sodium hydroxide solution to neutralize any remaining acidic components, and then with water to remove excess alkali. The benzene solution is dried with anhydrous sodium sulfate and the benzene is distilled off, first under atmospheric pressure, until the temperature of the liquid rises to about 125° C., and subsequently under reduced pressure of about 20 inches of mercury, until no more benzene distills even at a temperature of 125° C. The residue in the still comprises malonic ester in sufficiently pure form to be suitable for subsequent preparation of barbituric acids.

Malonic ester prepared in accordance with the above procedure comprised 94.5 percent diethyl malonate and weighed about 909 lbs. as compared with the 1080 lbs. of malonic ester theoretically obtainable from 640 lbs. of monochloroacetic acid. This represented a yield of about 90 percent on the basis of malonic ester of 90 percent purity.

I claim:

1. In the process of producing malonic ester by simultaneously hydrolyzing and esterifying sodium cyanoacetate, the step which comprises heating a mixture which comprises sodium cyanoacetate, sodium chloride, ethanol, sulfuric acid and benzene, the benzene being present in the amount of about 0.5 to about 1.5 mols per mol of sodium cyanoacetate.

2. In the process of producing malonic ester by simultaneously hydrolyzing and esterifying the sodium cyanoacetate contained in the moist mixture obtained by the reaction of mono-chloracetic acid, sodium cyanide and sodium hydroxide, the step which comprises heating to a temperature of about 70° C. to about 80° C. a mixture containing proportionately about 1 mol of sodium cyanoacetate, about 2.8 mols of sulfuric acid, about 2.8 mols of ethanol and about 0.9 mol of benzene.

3. The process of producing malonic ester by hydrolyzing and esterifying sodium cyanoacetate, which comprises refluxing at a temperature of about 70° C. to about 80° C. a reaction mixture containing proportionately about 1 mol of sodium cyanoacetate, about 2.8 mols of sulfuric acid, about 2.8 mols of ethanol and about 0.9 mol of benzene, and recovering the malonic ester by diluting the reaction mixture with water, extracting the diluted mixture with benzene and evaporating the benzene.

CHARLES F. CHRISTIE.

REFERENCES CITED

The following references are of record in the file of this patent:

UNITED STATES PATENTS

| Number | Name | Date |
| --- | --- | --- |
| 2,337,858 | Stoesser | Dec. 28, 1943 |

FOREIGN PATENTS

| Number | Country | Date |
| --- | --- | --- |
| 594,681 | Germany | Mar. 21, 1934 |

OTHER REFERENCES

Chemical Abstracts, vol. 32, page 2961 [1].